United States Patent Office 2,774,713
Patented Dec. 18, 1956

2,774,713

PROCESS FOR THE RECOVERY OF SAPONINS AND SAPOGENINS FROM VEGETABLE MATTER

David H. Gould, Leonia, Emanuel B. Hershberg, West Orange, and Temple Clayton, Parsippany, N. J., assignors to Schering Corporation, Bloomfield, N. J., a corporation of New Jersey No Drawing. Application October 6, 1952,
Serial No. 313,368

7 Claims. (Cl. 195—32)

The present invention relates to the recovery or isolation of steroid material from vegetable plants containing the same, and more particularly to the extraction of saponins and sapogenins from roots of the family Dioscoreaceae.

It is the general object of the present invention to provide a process for the recovery of steroidal material from vegetable matter whereby the yield of steroids is markedly increased.

More specifically, it is an object of the invention to provide a process for the preliminary treatment of steroid-containing vegetable mattter whereby the content of extractable saponins and/or sapogenins is very materially increased.

It is a further object of the invention to provide a simple and inexpensive treatment for steroid-containing vegetable matter, and particularly of roots of the family Dioscoreaceae whereby the recovery of steroid material by known methods of extraction is substantially doubled and even more increased, so that the cost of manufacture of physiologically active steroids, like the cortical and sex hormones, and particularly of cortisone, from the extracted steroids is considerably reduced.

It is a still further object of the invention to provide a process for the preliminary treatment particularly of vegetable matter containing glycosides capable of yielding diosgenin in much greater yield than was heretofore obtainable.

Other objects and advantages of the invention will be apparent from the following detailed description thereof.

In accordance with the present invention, vegetable matter, and particularly the roots, of members of the family Dioscoreaceae, and especially of the dioscorea species which is known to the natives of Southern Mexico as "Barbasco," is ground or otherwise comminuted to a high degree of subdivision to effect breakdown of the cell structure to as extensive a degree as is commercially feasible, whereupon the wet pump is subjected to auto-fermentation, that is, it is allowed to ferment or become auto-transformed in its own juices or liquor for a period of time, preferably of several days' duration, at room or slightly elevated temperature. The pulp is thus caused to ferment in its natural state, and no inhibitory substances are added thereto. The fermented or auto-transformed pulp is then subjected to any known or suitable procedure for the extraction of the steroidal matter contained therein, as to the process described in the copending application of Emanuel B. Hershberg and David H. Gould, entitled Process For the Extraction of Sapogenins From Plant Materials, filed October 10, 1952, Serial No. 314,198.

In the usual process for obtaining steroids as saponins or sapogenins from plant sources, the plant material is degraded or comminuted by slicing, cutting, chopping, grinding or shredding to permit better access of extracting solvents to the steroidal material; and the degraded material is promptly dried to prevent mold and rotting and to remove water, usually present in large amount (40 to 85%), giving material weighing one-half to one fifth of the original weight and therefore much easier to extract. The drying is achieved by any convenient procedure, usually by spreading thin layers in the sun, or in a rotating crop dryer. The dried material is then treated with an appropriate solvent, such as methanol, ethanol, isopropanol, butanol, water, etc., to extract the saponins. In some cases, these compounds were utilized as such, and in others, hydrolysis by convenient means, usually dilute mineral acid, gave the aglycone portions, i. e. sapogenins.

Prior to the present invention, there was no reason to doubt that this procedure gave the maximum yield of steroids, and all reported procedures have followed this general process outline. For a given plant material, the yields of the steroid product obtained in different laboratories did not differ significantly, which is the expected result if the process has attained the more or less maximum possible yield.

We have found, nevertheless, that the yield of steroidal material may be increased considerably by an unusual modification of the standard process, particularly as applied to the isolation of dioscin and diosgenin from Dioscorea roots. It was heretofore assumed that rotting or fermenting of the root tissue, either whole or ground, must be avoided to obtain the best results. To this end, the degraded roots have, in the past, been promptly dried to inactivate enzymes and prevent bacterial action.

Contrary to this practice, we have found that it is highly desirable to cause the degraded or ground pulp to ferment or become auto-transformed for a considerable time before drying. For this purpose it is desirable to grind the fresh roots, or by other means degrade them so that relatively little of the cellular structure remains, and the protoplasm is available for whatever reactions may occur during the fermentation. A satisfactory degree of grinding is one by which the vegetable matter is reduced to a pulp the greater part of which is composed of particles of 8 to 200 mesh or smaller size. The fermentation or auto-transformation is allowed to proceed for from one day to about three weeks after the comminution. The optimum time depends on how favorable the conditions, particularly the temperature, are for the biochemical reactions.

The finely ground wet pulp is simply stored, in a heap, preferably in a bin which is relatively enclosed, and allowed to stand at from 15° to 40° C., the access of air apparently not being essential, though it may be desirable. The fermentation or auto-transformation proceeds quite readily. It is not known whether this is due to enzymatic action or to attack by associated bacteria or molds. In any case, after the fermentation or transformation for the selected period of time, the product is dried in the usual way. Extraction with alcohol, or other organic solvent, now gives a much higher yield of crude saponin, the increase being as much as 100% and even higher. The crude product may be purified and utilized as such, pharmaceutically as a cardiovascular drug, or as a detergent, a fish killer, etc. The crude saponin may, however, be hydrolyzed in known manner and the steroidal sapogenin, usually diosgenin, is isolated as a raw material particularly useful for the production of hormones. Here again, the yield is found to be as much as 100% greater, and even more, than that obtained from roots dried immediately after comminution.

The following example illustrates the heretofore common or normal procedure for the treatment of the plant material.

EXAMPLE A

*Normal drying, extraction and hydrolysis of dioscorea roots*

A sample of 10 kg. of fresh roots, of a dioscorea species known in southern Mexico as "Barbasco," was sliced and dried by spreading the thin chips in the sun. The dried weight was 2095 g. The dried chips were then ground in a hammermill to reduce the material to 8 to 200 mesh particles, as in the examples below, to eliminate any influence of particle size on the amount of material extracted. The dried ground root pulp was extracted by refluxing 8 l. of 95% 2B ethanol through the material and allowing the return fluid to drip through. After 24 hours, the extract was separated and the extracting solvent was distilled off. The dried residue of crude saponin weighed 636 g. (30.4%). Crystallization of a sample from n-butyl alcohol gave 5.8% of crystalline dioscin saponin. The results are the same if the roots are ground prior to the drying.

The residue of root pulp was further extracted with 8 l. of 50% hot alcohol by pumping the hot solvent through the mass. Evaporation of this extract gave 69 g. of a resin from which no saponin could be obtained on crystallization and no sapogenin was obtained on treatment with acid (HCl). Re-extraction with water in the same manner gave a negligible residue on evaporation of the extract. The last two extractions show that further steroid in the form of a polysaccharide derivative insoluble in alcohol is not present in the roots, i. e. extraction of steroids is essentially complete with 95% alcohol.

The main portion of crude saponin was taken up in 1.2 l. of 85% alcohol and treated with 350 ml. of concentrated hydrochloric acid. The solution was stirred and refluxed 3 hours. The cooled mixture was poured into toluene (5 l.) and 4 l. of water were added. The water layer was discarded after stirring and separating, and the toluene washed once more with water.

The toluene layer was then filtered and evaporated to give a residue of 187 g. of crude diosgenin. This was acetylated by heating with 370 ml. of acetic anhydride. The cooled mixture was filtered and the product was washed with dilute acetic acid and cold methanol. On drying, the diosgenin acetate weighed 59 g. (2.8% of the dried roots), M. P. 176–188° C. Repeated experiments by this standard procedure even with the usual variations of extracting solvent and method of hydrolysis, gave yields of 2.0 to 2.9% of diosgenin acetate from this dioscorea species.

The following examples, which show by way of illustration the improved procedure in accordance with the invention, establish that the yield is roughly doubled by our fermentation or auto-transformation process.

EXAMPLE 1

*Transformation, extraction and hydrolysis of dioscorea roots*

A batch of 25 kgs. of the roots of the same dioscorea species as in Example A, was ground in an attrition mill as by a hammermill until most of the particles were of 8 to 200 mesh size or smaller, and the fine wet pulp was stored in a metal bin with a loosely fitting lid. The mass was allowed to stand at room temperature (25–30° C.) for five days. A fermentation odor was quite noticeable. The mass was then spread on concrete slabs in thin layers in the sun and dried for two days. The dried roots weighed 4.75 kg. or 19% of the wet weight.

A sample of 2 kg. of the dried material was extracted with 8 l. of 95% ethanol as in Example A. Upon distillation of the solvent, the semi-crystalline residue of crude saponin weighed 728 g. or 36.4% of the dried roots. Recrystallization of a sample from n-butanol gave 12.8% of crystalline dioscin saponin, roughly twice as much as the non-fermentative process gave.

The main bulk (727 g.) of the crude saponin was taken up in 1.5 l. of 95% alcohol, treated with 425 ml. of concentrated hydrochloric acid and hydrolyzed as in Example A. The reaction mixture was poured into toluene and worned up as in Example A. The residue of semi-crystalline diosgenin weighed 190 g., again more than in Example A.

Acetylation of the diosgenin as in Example A gave 111 g. of diosgenin acetate, M. P. 186–193°. The overall yield from the dry roots, 5.55%, is roughly twice that of Example A, and the quality of the product is noticeably better, as is indicated by the higher melting point.

Many repetitions of Example 1 with fermentation or auto-transformation periods of from 3–7 days have given yields of diosgenin acetate of 4.75 to 6.25% of the dry root weight. Ordinarily it is not practical to extend the transformation much beyond one week. We have, however, carried out fermentations or auto-transformations for as long as 21 days and, as shown in Example 2, the yield is increased over that found in Example 1.

EXAMPLE 2

*Long auto-transformation of dioscorea roots*

A sample of 1550 g. of roots of the species of dioscorea used in Example A was ground in a hammermill to the degree indicated above and allowed to drain somewhat. The damp mass was stored in a heavy paper bag for three weeks at 25 to 30° C. When the bag was opened, a fermentation odor and some growth of mold were noticed. The material was spread in trays and dried in a draft oven. The dry weight was 280 g., 18% of the wet weight.

Extraction with 1 l. of methanol as in Example A gave 63 g. or 22.5% of fairly crystalline dioscin saponin. Hydrolysis in 150 ml. of alcohol with 40 ml. of concentrated hydrochloric acid as in Example A gave 36 g. of crude diosgenin, a yield of 12.85% based on the dry roots, which was greater than that obtained in Example 1. Acetylation as in Example A gave 22.4 g. of diosgenin acetate, M. P. 189–194° C. The overall yield of 8.0% based on the dry roots is again higher than that of Example 1.

We are unable to explain the very large increase in yield which we have found obtainable by our new process. While we do not wish to be committed to this theory, it may be surmised, however, that the same biogenetic processes which produce steroidal saponins in the live plants, are stimulated by the shock to the plant and cell structure. Presumably to counteract the "accident" to the plant, the processes rapidly generate more saponin until the normal enzymes which control the processes gradually become inactivated. Since these endymes cannot be replaced as in the live plants, the reaction eventually stops, and the maximum of steroid is then obtained. On the other hand, it may be that contact with exogenous microorganisms causes the plant material to produce these supernormal amounts of steroids.

The process above described can be applied also to steroid-bearing plant material other than that containing the diosgenin-yielding dioscin saponin, and other variations can be resorted to within the scope of the appended claims without departing from the spirit of the invention. Thus the grinding operation can be replaced or supplemented by placing under pressure followed by sudden release of pressure to effect rupture of cell walls of the plant material.

We claim:

1. In a process for the recovery of dioscin saponin and diosgenin from dioscorea roots, the steps which comprise comminuting the roots, and subjecting the resulting pulp to auto-transformation in its natural state and in the absence of added inhibiting maetrial until the content of extractable saponin and diosgenin has markedly increased over the quantity obtainable from the fresh roots.

2. Process according to claim 1, wherein the transformed mass is dried and then treated for the isolation of the saponin and diosgenin contained therein.

3. Process according to claim 1, wherein the transformation proceeds for a period of at least one day.

4. Process according to claim 1, wherein the transformation proceeds for a period of about five days at room temperature.

5. Process according to claim 1, wherein the vegetable matter is reduced to a pulp the greater part of which is composed of particles of 8 to 200 mesh drive.

6. A process for the recovery of dioscin saponin and diosgenin from dioscorea roots, which comprises comminuting the roots, subjecting the resulting pulp to autotransformation in its own juice and in the absence of added inhibiting material for a period of at least one day, whereby the content of dioscin saponin and diosgenin is markedly increased over that contained in the fresh roots, drying the transformed material, and subsequently extracting the same with a solvent for the saponin and diosgenin.

7. Process according to claim 6, wherein the transformation proceeds for from 5 to 21 days at temperatures up to about 40° C.

References Cited in the file of this patent

UNITED STATES PATENTS 2,069,687 Stoll et al. _____ Feb. 2, 1937

OTHER REFERENCES

Fieser and Fieser, Natural Products Related to Phenanthrene, third edition, page 579 (1949). Reinhold Publishing Corp., New York City. (Copy in Scientific Library.)